United States Patent [19]

Taylor

[11] 4,399,425

[45] Aug. 16, 1983

[54] CIRCUIT FOR OPERATING A FLIGHT NAVIGATION INDICATOR

[75] Inventor: Lothar J. Taylor, Cedar Rapids, Iowa

[73] Assignee: Rockwell International Corporation, El Segundo, Calif.

[21] Appl. No.: 224,609

[22] Filed: Jan. 12, 1981

[51] Int. Cl.³ ............................................. G08G 5/00
[52] U.S. Cl. ............................ 340/27 NA; 340/27 R; 340/27 AT; 343/108 R; 116/289; 73/178 R; 455/155; 33/328
[58] Field of Search .......... 340/27 NA, 27 R, 27 AT; 244/181, 183, 185, 186; 364/443, 444; 73/178 R, 178 T; 343/108 R, 112 A, 107; 33/328; 455/133, 134, 145, 152, 153, 155, 226, 227, 229, 231, 232, 237, 239, 240, 241; 116/289-296

[56] References Cited

U.S. PATENT DOCUMENTS 3,474,407 10/1969 Chesmond ..................... 340/27 NA
3,806,934 4/1974 Hays, Jr. ........................ 340/27 NA
3,891,832 6/1975 Rodgers et al. ............... 340/27 NA Primary Examiner—Donnie L. Crosland
Attorney, Agent, or Firm—George A. Montanye; Howard R. Greenberg; H. Fredrick Hamann

[57] ABSTRACT

A circuit for use in aircraft navigation equipment includes operational amplifiers to drive a cockpit indicator such as an electric meter linearly over a first predetermined range, constantly over a second predetermined range, and out of view over a third predetermined range. A first operational amplifier circuit provides a linear drive to the indicator and a second operational amplifier circuit controls the constant drive current to the meter and defines first and second breakpoints which begin the constant in view and constant out of view responses, respectively. The circuit needs only a single input signal for operation.

15 Claims, 2 Drawing Figures

CIRCUIT FOR OPERATING A FLIGHT NAVIGATION INDICATOR

BACKGROUND OF THE INVENTION

1. Field of the Invention

This invention relates to improvements in indicators such as the type used to display flight navigation information and more particularly to electronic circuitry used in conjunction with such indicators to provide signals to operate such indicators in predetermined manners within certain predefined ranges.

2. Description of the Prior Art

In the navigation equipment art, it has been practiced typically to provide an electric meter indicator to display course deviations. For example, in an instrument low-approach system (ILS) indicator, glideslope and localizer signals are provided from which the relative aircraft position can be determined. For example, typically an electric meter in the cockpit indicates the position of the aircraft above or below a glideslope path defined by patterned electromagnetic energy lobes transmitted from an antenna adjacent the end of the runway. The glideslope indicator indicates the deviation of the aircraft above or below the glideslope by meter deviations above or below a centered position. When the aircraft is within a predetermined distance from the glideslope signal antenna just prior to landing, the indicator variations are linear with deviation from the glideslope course. On the other hand, when the aircraft is beyond a predetermined range from the runway, typically a flag is maintained clearly indicating to the pilot that the information displayed on the indicator cannot be relied upon. In some devices, although not typically, the indicator may be positioned in a "fly up" or other predetermined position.

In addition, recently, in certain circumstances, aircraft warning indicators have desirably been driven completely off of the indicator scale. This is desirable, for instance, especially when the received signal is insufficient to reliably indicate a course upon which the aircraft should be flown, or, if no signal at all is received by the navigation receiver. Such out-of-view operation has been achieved by the use of secondary springs in electric meter indicators. Secondary springs, however, are difficult to adjust, requiring highly skilled maintenance technicians, and, may additionally affect the operation of the meter in its intended response over a linear indication range.

Additional means have been used to drive the indicator meter off scale in the form of operational amplifiers whose positive output is limited to keep the pointer partially in view. A discrete second signal (such as a "loc mode" in a glideslope application) is then removed to drive the indicator out of view. This, of course, has disadvantages in the need for a discrete second signal, which may not be present in certain "lost signal" conditions, and, in addition, requires that the operational amplifiers be carefully controlled to insure little drive variations.

SUMMARY OF THE INVENTION

In view of the above, it is, therefore, an object of the invention to provide in a navigation system an indicator and drive means which provides a linear indication over a first predetermined course range, a second, constant, indication beyond the predetermined range to a second predetermined range, and an off course indication beyond the second predetermined range or in the event of a lost navigation signal.

It is another object of the invention to provide such indicator and drive means which is independent of signals other than the primary signal to be indicated.

It is still another object of the invention to provide such indicator and drive means which employs operational amplifiers, the indications displayed being relatively insensitive to variations in the operational amplifier drive.

It is still another object of the invention to provide such indicator and drive means which is free of secondary mechanical springs to provide the "off scale" indication.

These and other objects, features and advantages will become apparent to those skilled in the art from the following detailed description when read in conjunction with the appended claims and accompanying drawings.

The invention provides, in its broad aspect, in aircraft navigation equipment of the type in which course indicating information is displayed on a cockpit indicator, the improvement of a circuit to drive the indicator from a single input signal source: (1) linearly for $a < a_1$; (2) constantly for $a_1 < a < a_2$; and (3) off scale for $a > a_2$, where a is an indicator driving signal and $a_1$ and $a_2$ are predetermined limits to define a change in desired indicator display response.

BRIEF DESCRIPTION OF THE DRAWING

The invention is illustrated in the accompanying drawing, wherein.

Figure 1:
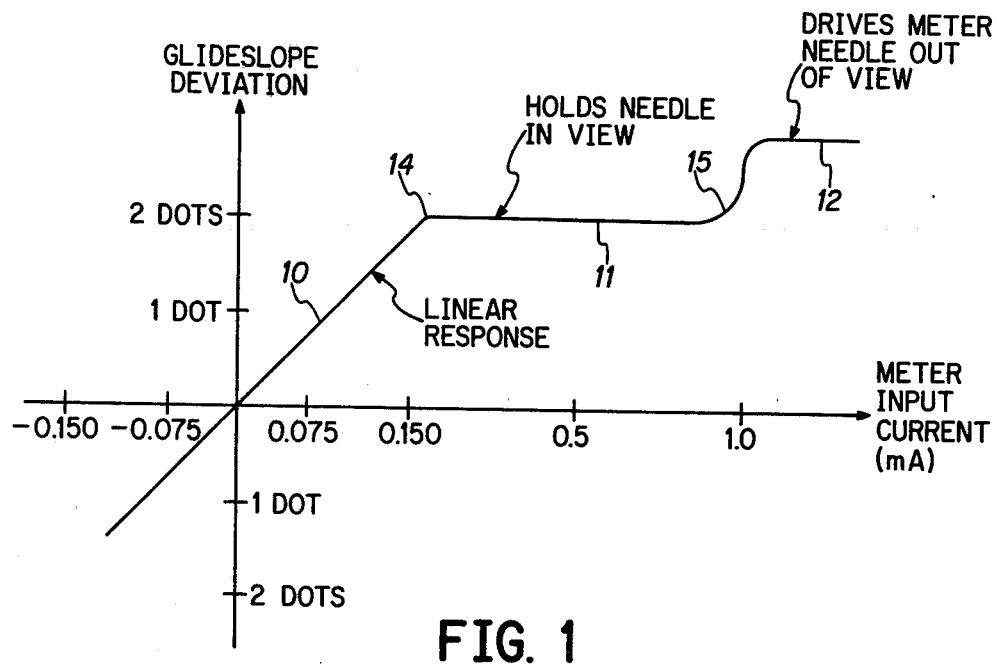
FIG. 1 is a graph of the desired response of meter input current versus glideslope deviation, achieved by the circuit shown in FIG. 2, in accordance with the invention.
Figure 2:
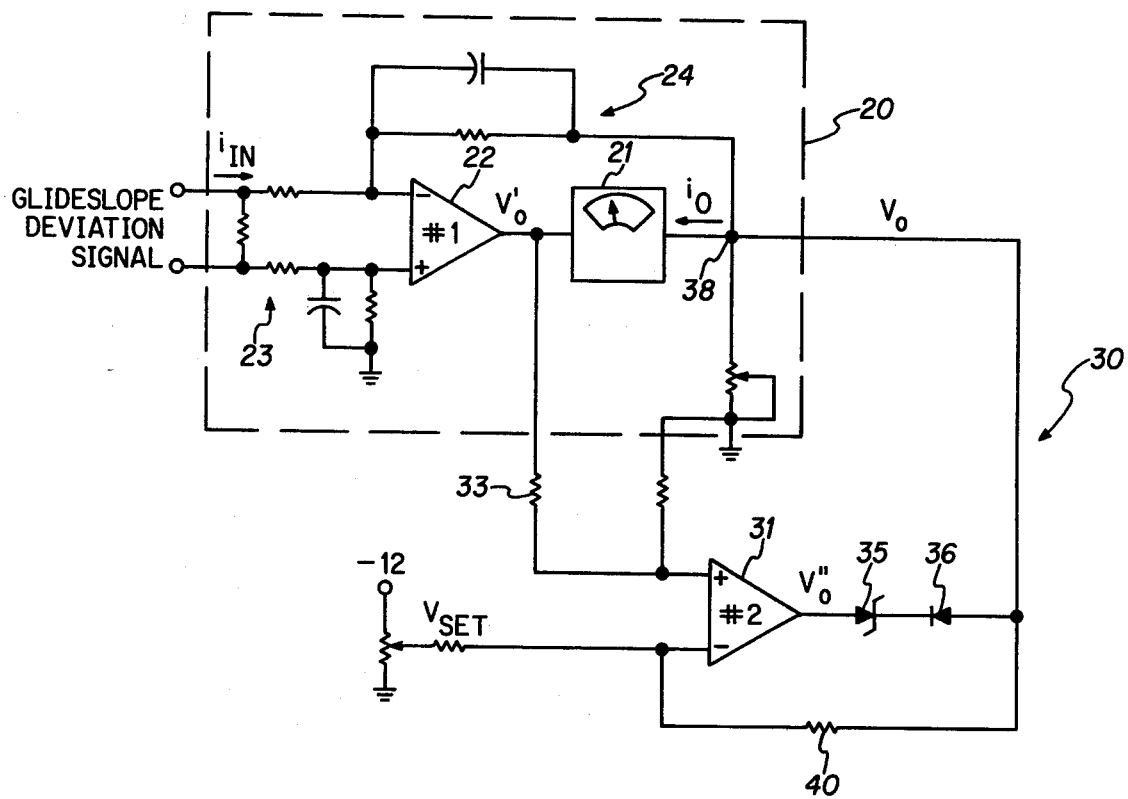

And, FIG. 2 is a circuit, in accordance with the invention, for achieving the meter input current response, shown in FIG. 1, in a glideslope usage.

DETAILED DESCRIPTION OF THE PREFERRED EMBODIMENTS

It should be appreciated that although the invention is described herein with respect to a glideslope signal processing circuit, that the circuit and operational principles associated with it are equally applicable to meet the needs of other signal processing requirements. For example, a circuit may be applicable for use in localizer and other avionics uses, as well as the glideslope use described and illustrated.

With respect to a glideslope embodiment, a desired response curve is illustrated in FIG. 1. In FIG. 1, the glideslope deviation is spread along the y axis and the meter input current is spread along the x axis. As can be seen, the response includes three segments, a linear response segment 10 extending between plus and minus two dots glideslope deviation, and correspondingly plus and minus 0.150 mA meter input current; a constant response 11 at a glideslope deviation of two dots and meter input current between 0.150 and 1.0 mA; and a second constant response 12 at which the meter needle is driven out of view at a glideslope deviation above two dots and meter input current above 1.0 mA. The response is, as shown, with sharp breakpoints 14 and 15 at 0.150 and 1.0 mA, respectively, between the linear response and the first constant response, and between the first constant response and second constant response.

The response shown in FIG. 1 is achieved by the circuit of FIG. 2, in which the encircled circuit portion 20 provides a current $i_0$ to drive a display meter 21 between glideslope deviations of plus and minus two dots. It should be noted that although an electric meter 21 is shown, that other suitable indicator means, such as liquid display indicators or the like, may be used to serve this indicator function. The linear drive signal providing circuit 20 includes an operational amplifier 22 having an input resistor network 23 and feedback network 24 connected, as shown.

To achieve the first and second constant drive current responses, shown by portions 11 and 12 in FIG. 1, a second operational amplifier circuit 30 is provided. Circuit 30 includes a second operational amplifier 31 having its noninverting input connected to receive the voltage at the output of the first operational amplifier 22, by the resistor 33. The inverting input of the operational amplifier 31 is connected to receive a voltage, designated $V_{set}$. The adjustable voltage $V_{set}$ determines, as will hereinafter be apparent, the breakpoint 14 in the meter driving current response, shown in FIG. 1.

The output of operational amplifier 31 is connected through a Zener diode 35 in forward direction and diode 36 in reverse direction to the node 38 at the input to meter 21. In addition, a feedback resistor 40 is connected from the anode of the diode 36 to the inverting input of the operational amplifier 31.

Thus, in operation, the driving current $i_0$ to the meter 21 within a glideslope deviation range of plus and minus two dots is linearly relatable to the glideslope deviation, the linear drive being produced by the circuit portion 20, as above discussed. The breakpoint 14 and the response curve is controlled by the adjustment of the variable voltage $V_{set}$, which controls the conduction point of the diode 36. The operational amplifier 31 operates as a comparator when the voltage $V_{set}$ is less than the voltage ($V_o'$) at the output of the operational amplifier 22; and operates as a summing amplifier when the adjustable voltage $V_{set}$ is larger than the voltage at the output of the operational amplifier 22. Thus, when the operational amplifier 31 finds a voltage at its inverting input larger than the voltage $V_{set}$, the feedback loop including resistor 40, diode 36, and Zener diode 35, becomes operational. At this point, the operational amplifier 31 holds the voltage from node 38 to the output of the first operational amplifier 22 ($V_o - V_o'$) constant.

It should also be noted that this voltage ($V_o - V_o'$) will be equal to $V_{set}$ in the "in view" position. This allows the breakpoint 14 to be determined and located as desired merely by changing $V_{set}$.

With reference to the "out of view" meter position, when the second operational amplifier 31 begins to function as a summing amplifier, the avalanche breakdown voltage of the Zener diode 35 is exceeded. As mentioned, in the "in view" range, the second operational amplifier 31 operates to maintain a constant voltage difference across the meter 21 ($V_o - V_o'$), but as the voltage $V_o'$ decreases, the range of the second operational amplifier 31 will be reached. At this point, the breakpoint 15 in FIG. 1, the output of the second operational amplifier 31 $V_o''$, and the voltage at the node 38 $V_o$ are held constant. It can, therefore, be seen that the breakpoint 15 can be varied by the selection of the Zener diode 35, as the voltage drop across the Zener diode 35 directly affects the point at which the operational amplifier 31 exceeds its operational limits. Further, when the voltages $V_o''$ and $V_o$ are constant, the output voltage of the first operational amplifier 22 is still permitted to further decrease. Thus, additional current is drawn through the meter 21 effecting the "out of view" meter position.

Although the invention has been described and illustrated with a certain degree of particularity, it is understood that the disclosure has been made by way of example only and that numerous changes in the combination and arrangement of parts may be resorted to by those skilled in the art without departing from the spirit and scope of the invention as hereinafter claimed.

I claim:

1. In an aircraft navigation system wherein course indicating information is displayed on a cockpit indicator, the improvement comprising:
   means for controlling said cockpit indicator for providing (1) a linear display on said indicator solely in response to a signal representing course information falling within a first signal range, (2) a first constant display on said indicator solely in response to said signal falling within a second signal range, and (3) an off-scale display on said indicator solely in response to said signal falling within a third signal range.

2. The system of claim 1 wherein said course information is provided by a signal a, where a is the signal from said first signal range for values of a less than a1; a is the signal from said second signal range for values of a which are greater than a1 and less than a2; and a is the signal from said third signal range for values of a greater than a2; wherein a1 and a2 are predetermined magnitudes of the signal a.

3. In an aircraft navigation system which displays course information on an electric meter, the improvement comprising:
   an input providing a single signal representing course information; and
   means responsive solely to said signal for providing (1) a linear meter driving signal for input signal magnitudes less than a first predetermined magnitude, (2) a first substantially constant meter driving signal for input signal magnitudes greater than said first predetermined magnitude and less than a second predetermined magnitude, and (3) an off-scale meter driving signal for input signal magnitudes greater than said second predetermined magnitude.

4. The improvement of claim 3 wherein said single input is a current signal representing glide slope deviation.

5. The improvement of claim 3 wherein said single input is a localizer signal.

6. The improvement of claim 3 wherein said single input is a current signal wherein said first predetermined magnitude is approximately equal to 0.150 mA and said second predetermined magnitude is approximately equal to 1.0 mA.

7. An apparatus for displaying course information in an aircraft comprising:
   an electric meter;
   a first operational amplifier having at least one input for receiving a navigation signal to be displayed on said meter and having an output voltage for providing a linear meter driving signal to said meter solely in response to said navigation signal;
   a second operational amplifier having inputs coupled to compare the output of said first operational amplifier and a predetermined voltage, and having an output coupled to provide a first substantially constant meter driving signal to said meter when the output voltage of said first operational amplifier is less than said predetermined voltage; and semiconductor means for controlling the output of said second operational amplifier to cause an off-scale meter driving signal to be provided to said meter to produce an off-scale meter indication when the output of said second operational amplifier reaches a predetermined value.

8. The improvement of claim 7 wherein said predetermined voltage which is compared with the output of said first operational amplifier is established to produce an output of said second operational amplifier when the navigation signal is a glide slope signal and exceeds two dots.

9. The improvement of claim 7 wherein said navigation signal is a glideslope signal.

10. The improvement of claim 7 wherein said navigation signal is a localizer signal.

11. The improvement of claim 7 wherein said semiconductor means is a Zener diode.

12. An aircraft navigation display system comprising:
means for receiving a single input signal representing course information;
means for providing a display representing said course information; and
means responsive solely to said single input signal for causing (1) a linearly changing display representing said course information during a first display range, (2) a first constant display representing said course information during a second display range, and (3) a second substantially constant display representing said course information during a third display range.

13. In an aircraft navigation system wherein course indicating information is displayed on a cockpit indicator, the improvement comprising:
means for controlling said cockpit indicator for providing (1) a linear display on said indicator solely in response to a signal representing course information falling within a first signal range, (2) a first constant display on said indicator solely in response to said signal falling within a second signal range, and (3) an off-scale display on said indicator solely in response to said signal falling within a third signal range, said second signal range falling between said first and third signal range.

14. An aircraft navigation display system comprising:
means for receiving a single input signal representing course information;
means for providing a display representing said course information; and
means responsive solely to said single input signal for causing (1) a linearly changing display representing said course information during a first display range, (2) a first constant display representing said course information during a second display range, and (3) a second substantially constant display representing said course information during a third display range, said second display range falling between said first and third display range.

15. An apparatus for displaying course information in an aircraft comprising:
an electric meter having a first and second input;
a first operational amplifier having an inverting and a non-inverting input and an output, said inverting and non-inverting inputs being coupled to receive a navigation signal to be displayed on said meter, said inverting input also being coupled to the first input of said meter and the output of said first operational amplifier being coupled to the second input of said meter;
a second operational amplifier having an inverting input and a non-inverting input and an output, said inverting input of said second operational amplifier being coupled to a variable reference voltage, said non-inverting input being coupled through an impedance to the output of said first operational amplifier;
a zener diode having an anode and cathode with said anode coupled to the output of said second operational amplifier; and
a diode rectifier having an anode and cathode, the cathode of said diode rectifier being coupled to the cathode of said zener diode and the anode of said diode rectifier being coupled to the first input of said meter and also through an impedance to the inverting input of said second operational amplifier;
the cooperation of said first and second operational amplifier with said zener and diode rectifiers being such as to provide a linear meter driving signal to said meter solely in response to said navigation signal during a first display range, to provide a first substantially constant meter driving signal solely in response to said navigation signal during a second display range, and to provide a third substantially constant meter driving signal to said meter to produce an off-scale meter indication during a third display range, said second display range being located between said first and third display range.

* * * * *